(12) United States Patent
Vishlitzky et al.

(10) Patent No.: US 6,594,726 B1
(45) Date of Patent: Jul. 15, 2003

(54) DIGITAL DATA STORAGE SUBSYSTEM INCLUDING ARRANGEMENT FOR EFFICIENTLY CONTROLLING FAST WRITE STORAGE OPERATION

(75) Inventors: Natan Vishlitzky, Brookline, MA (US); Haim Kopylovitz, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 64 days.

(21) Appl. No.: 10/002,053

(22) Filed: Nov. 15, 2001

(51) Int. Cl.$^7$ .............................................. G06F 12/08
(52) U.S. Cl. ....................................... 711/113; 711/156
(58) Field of Search .................................. 711/113, 118, 711/156

(56) References Cited

U.S. PATENT DOCUMENTS

| | | | | |
|---|---|---|---|---|
| 5,206,939 A | * | 4/1993 | Yanai et al. .................... 711/4 |
| 5,381,539 A | * | 1/1995 | Yanai et al. ................. 711/133 |
| 5,787,473 A | * | 7/1998 | Vishlitzky et al. .......... 711/134 |
| 5,900,009 A | * | 5/1999 | Vishlitzky et al. .......... 711/113 |
| 6,052,797 A | * | 4/2000 | Ofek et al. ..................... 714/6 |
| 6,101,588 A | * | 8/2000 | Farley ......................... 711/168 |
| 6,275,897 B1 | * | 8/2001 | Bachmat ..................... 711/114 |
| 6,298,386 B1 | * | 10/2001 | Vahalia et al. .............. 709/234 |
| 6,484,234 B1 | * | 11/2002 | Kedem ........................ 711/113 |
| 6,513,102 B2 | * | 1/2003 | Garrett et al. .............. 711/165 |

* cited by examiner

Primary Examiner—Hiep T. Nguyen
(74) Attorney, Agent, or Firm—Penelope S. Wilson; John M. Gunther; Richard A. Jordan

(57) ABSTRACT

A digital data storage system comprises a storage device, a descriptor memory and a control device. The storage device stores a series of records, the records being organized in a plurality of tracks, each track being associated with one of a plurality of cylinders. The descriptor memory stores a descriptor associated with storage device. The descriptor contains selected information relating to the records stored by the at least one storage device. Each descriptor includes a plurality of cylinder portions each configured to store selected information relating to a respective one of the cylinders in the storage device. Each cylinder portion, in turn, includes a plurality of track descriptors each configured to store selected information relating to a respective one of the tracks in the respective cylinder. The storage device also stores the descriptor associated therewith, the cylinder portions of the descriptor being augmented with additional information relating to the respective ones of the cylinders. The digital data storage system further includes a control device configured to use the at least one descriptor in connection with accesses of records in the at least one storage device. In one embodiment, the additional information includes, for each cylinder, a cylinder identifier and, for each track, information indicating whether one of a plurality of types of access operation in connection with the track is to be performed.

5 Claims, 11 Drawing Sheets

```
┌─────────────────────────────────────────────┐
│ 140. A STORAGE CONTROLLER 21(m) DETERMINES THAT │
│ IT IS TO PERFORM A DE-STAGING OPERATION IN  │
│ CONNECTION WITH A TRACK, INFORMATION FROM   │
│ WHICH IS CACHED IN A CACHE SLOT 31(s)       │
└─────────────────────────────────────────────┘
                      │
                      ▼
┌─────────────────────────────────────────────┐
│ 141. STORAGE CONTROLLER 21(m) DETERMINES FROM │
│ THE CACHE SLOT POINTER 54 THE CACHE SLOT 31(s) IN │
│ WHICH THE INFORMATION IS STORED.            │
└─────────────────────────────────────────────┘
                      │
                      ▼
┌─────────────────────────────────────────────┐
│ 142. STORAGE CONTROLLER 21(m) TRANSFERS THE │
│ INFORMATION FROM THE CACHE SLOT 31(s) TO THE │
│ RESPECTIVE STORAGE DEVICE 22 FOR STORAGE    │
└─────────────────────────────────────────────┘
                      │
                      ▼
┌─────────────────────────────────────────────┐
│ 143. STORAGE CONTROLLER 21(m) CLEARS THE TRACK │
│ WRITE PENDING FLAG 63                       │
└─────────────────────────────────────────────┘
                      │
                      ▼
┌─────────────────────────────────────────────┐
│ 144. STORAGE CONTROLLER 21(m) CLEARS THE    │
│ FORMAT PENDING FLAG 65 IF THAT FLAG IS SET  │
└─────────────────────────────────────────────┘
```

*FIG. 5D*

160. STORAGE CONTROLLER 21(m) DETERMINES THAT INFORMATION IN A TRACK DESCRIPTOR 36(C)(t) RELATING TO INFORMATION STORED ON, OR TO BE STORED ON, THE ASSOCIATED TRACK HAS BEEN UPDATED

161. STORAGE CONTROLLER 21(m) COPIES THE TRACK DESCRIPTOR 36(C)(t) FROM THE CACHE INDEX DIRECTORY 32 TO THE RESPECTIVE STORAGE DEVICE 22 FOR STORAGE

*FIG. 5E*

```
┌─────────────────────────────────────────────┐
│ 180. CHANNEL ADAPTER 24(n) RECEIVES A STORAGE│
│ REQUEST OR A COMMIT COMMAND                  │
└─────────────────────────────────────────────┘
                      │
                      ▼
┌─────────────────────────────────────────────┐
│ 181. CHANNEL ADAPTER 24(n), IN ADDITION TO SETTING │
│ THE TRACK WRITE PENDING FLAG 63 AND (IF IT   │
│ RECEIVED A COMMIT COMMAND) CLEARING THE FAST │
│ WRITE PENDING FLAG 65 IN THE TRACK DESCRIPTOR│
│ 36(C)(t), ALSO CONDITIONS THE FLAG 102(L)(t) IN THE │
│ LOWEST LEVEL 101(L) THAT IS ASSOCIATED WITH THE │
│ TRACK IN THE DATA STRUCTURE 100 THAT IS      │
│ ASSOCIATED WITH THE STORAGE DEVICE 22.       │
└─────────────────────────────────────────────┘
                      │
                      ▼
┌─────────────────────────────────────────────┐
│ 182. CHANNEL ADAPTER 24(n) WILL ENSURE THAT THE │
│ APPROPRIATE FLAGS ARE SET IN THE OTHER LEVELS│
│ 101(L-1)...101(1)                            │
└─────────────────────────────────────────────┘
                      │
                      ▼
┌─────────────────────────────────────────────┐
│ 183. STORAGE CONTROLLER 21(m), IN INITIATING │
│ DE-STAGING OF A TRACK, CLEARS THE WRITE PENDING │
│ FLAG 63 AND THE FLAG 102(L)(t) ASSOCIATED WITH THE │
│ TRACK IN THE LOWEST LEVEL 101(L) OF THE DATA │
│ STRUCTURE 100                                │
└─────────────────────────────────────────────┘
                      │
                      ▼
┌─────────────────────────────────────────────┐
│ 184. STORAGE CONTROLLER 21(m) DETERMINES     │
│ WHETHER THE FLAG IN A NEXT HIGHER LEVEL SHOULD │
│ BE CLEARED AND, IN THAT OPERATION, TESTS FLAGS IN │◄── B
│ THE CURRENT LEVEL ASSOCIATED WITH THE FLAG IN│
│ THE NEXT HIGHER LEVEL                        │
└─────────────────────────────────────────────┘
                      │
                      ▼
                     (A)                        (B)
```

*FIG. 6A*

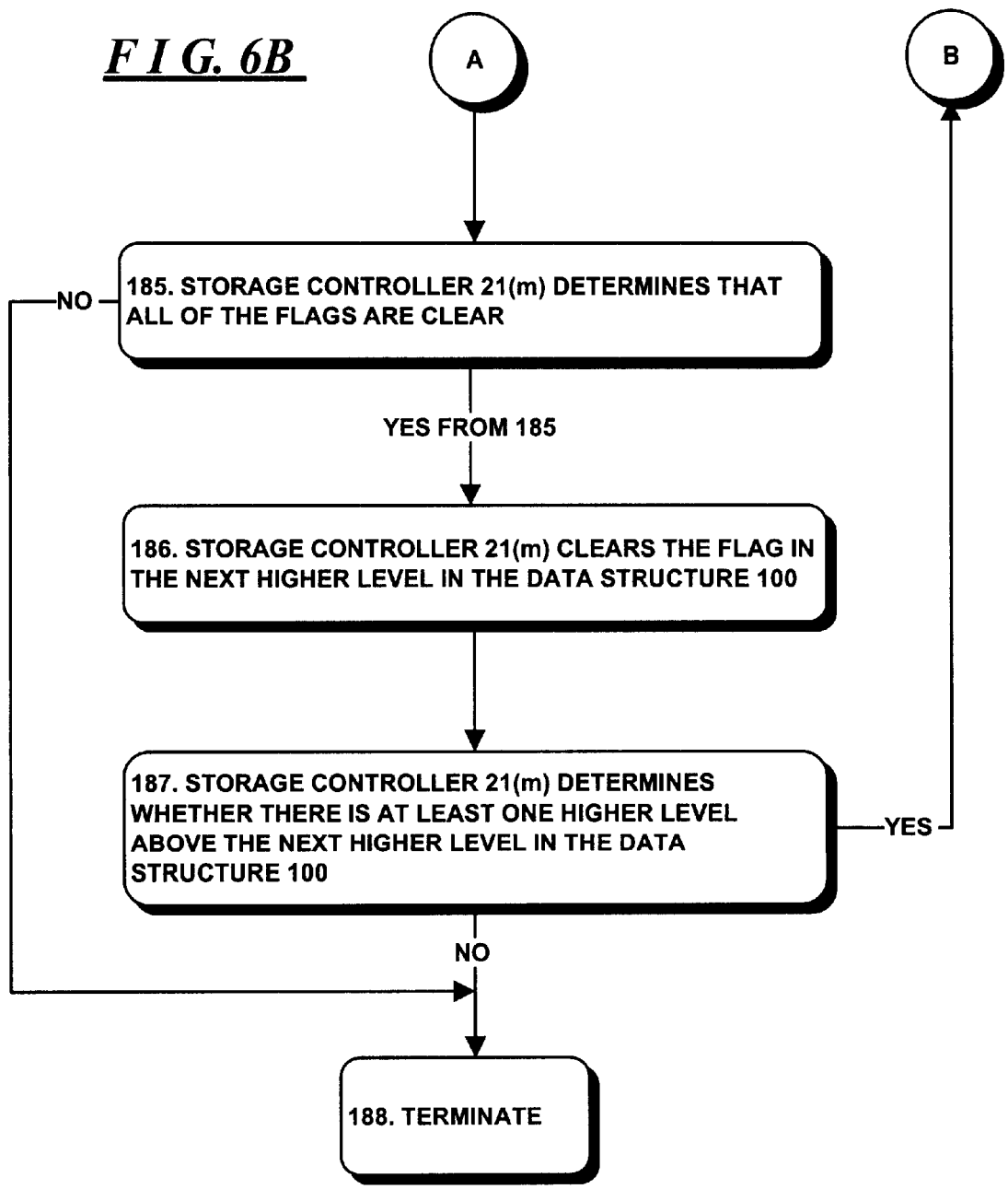

DIGITAL DATA STORAGE SUBSYSTEM INCLUDING ARRANGEMENT FOR EFFICIENTLY CONTROLLING FAST WRITE STORAGE OPERATION

FIELD OF THE INVENTION

The invention relates generally to the field of digital computer systems and more particularly to a digital data storage subsystem including a directory for efficiently controlling a "fast write" storage operation.

BACKGROUND OF THE INVENTION

In modern "enterprise" computing environments, that is, computer systems for use in an office environment in a company, a number of personal computers, workstations, mini-computers and mainframe computers, along with other devices such as large mass storage subsystems, network printers and interfaces to the public telephony system, may be interconnected to provide an integrated environment in which information may be shared among users in the company. Typically, users may be performing a variety of operations, including order receipt, manufacturing, shipping, billing, inventory control, and other operations, in which sharing of data on a real-time basis may provide a significant advantage over, for example, maintaining separate records and attempting to later reconcile them. The users may operate on their own data, which they may maintain on the computers they are using, or alternatively they may share data through the large mass storage subsystems.

One such large mass storage subsystem is described in, for example, U.S. Pat. No. 5,206,939, entitled System And Method For Disk Mapping And Data Retrieval, issued Apr. 27, 1993, to Moshe Yanai, et al (hereinafter, "the '939 patent"), and U.S. Pat. No. 5,381,539, entitled "System And Method For Dynamically Controlling Cache Management," issued Jan. 10, 1995, to Moshe Yanai, et al., both of which are assigned to the assignee of the present invention and incorporated herein by reference. That patent and those applications generally describe an arrangement which allows data, as used by computers, organized in records, with each record being in well-known "CKD" ("count-key-data") format, to be stored in storage devices which provide a "fixed block" storage architecture. In this arrangement, a large cache is used to buffer data that is transferred from the storage devices for use by the respective computers, and, if the data has been modified, transferred back to the storage devices for storage.

In a number of types of programs, information contained in a particular record may need to be updated a number of times in a relatively short time interval. To reduce the number of times the record is stored on the storage device, some computer systems provide a type of storage operation that is referred to as a "fast write" storage operation. Typically, during a conventional "write" storage operation, updated information will be transferred to the respective storage device for storage. This can result in an increase in the amount of information that is transferred to the particular storage device on which a record is stored if the record is to be updated a number of times in a relatively short time interval. In a "fast write" storage operation, however, the information updates are buffered until a "commit" command is issued, at which point the consolidated updates can be transferred to the storage device for storage. As an alternative, the program may determine that the updates are to be discarded, in that case a "discard" command may be issued, and the updates will not be transferred to the storage device for storage. A problem can arise, however, in managing the "fast write" storage operation, to facilitate distinguishing between the "fast write" storage operation and the "normal write" storage operation while a "fast write" storage operation is in process.

SUMMARY OF THE INVENTION

The invention provides a new and improved digital data storage subsystem including an arrangement for efficiently controlling a fast write operation In brief summary, the invention provides a digital data storage system comprising at least one storage device, a descriptor memory and a channel adapter. The at least one storage device is configured to store a series of records, the records being organized in a plurality of tracks, each track being associated with one of a plurality of cylinders. The descriptor memory configured to store at least one descriptor associated with said at least one storage device, said at least one descriptor containing selected information relating to the operational status at least one storage device, the selected information including, for each track, a write pending flag and a fast write pending flag. The channel adapter is configured to receive requests from a host, one type of request including a fast write request to initiate a fast write operation in connection with one of said tracks and another type of request including a commit request to terminate the fast write operation. The channel adapter, after receiving a request of the fast write type for one of said tracks, sets the fast write pending flag associated with the one of said tracks, and, after receiving a request of the commit type for said one of said tracks, copies the fast write pending flag associated with the one of said tracks to the write pending flag associated with the one of said tracks, and clears the fast write pending flag associated with the one of said tracks.

The digital data storage system further includes a memory configured to store a data structure, the data structure comprising a plurality of levels, including a lowest level and a highest level. The lowest level comprises a plurality of flags each associated with one of said tracks, and each successively higher level being associated with a selected series of flags in the next lower level. The channel adapter is further configured to, after receiving a request of the commit type for said one of said tracks, also copy the fast write pending flag to the flag associated with the track in the lowest level, and ensure that the flags in the higher levels associated with that flag in the lowest level are also set.

The digital data storage system further includes a storage controller that is configured to use the data structure in connection with transfers of data to the storage device for storage. In that connection, the storage controller is configured to determine from the flags comprising the highest level of the data structure whether any of the flags in the lowest level of the data structure are set, and, if so, proceed through successive levels down the data structure to identify the tracks for which the flags in the lowest level of the data structure are set, and control transfer of data for the identified tracks.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 6 depicts a flow chart of operations performed by the storage subsystem in connection with operations described in connection with FIG. 4.

DETAILED DESCRIPTION OF AN ILLUSTRATIVE EMBODIMENT

Figure 1:
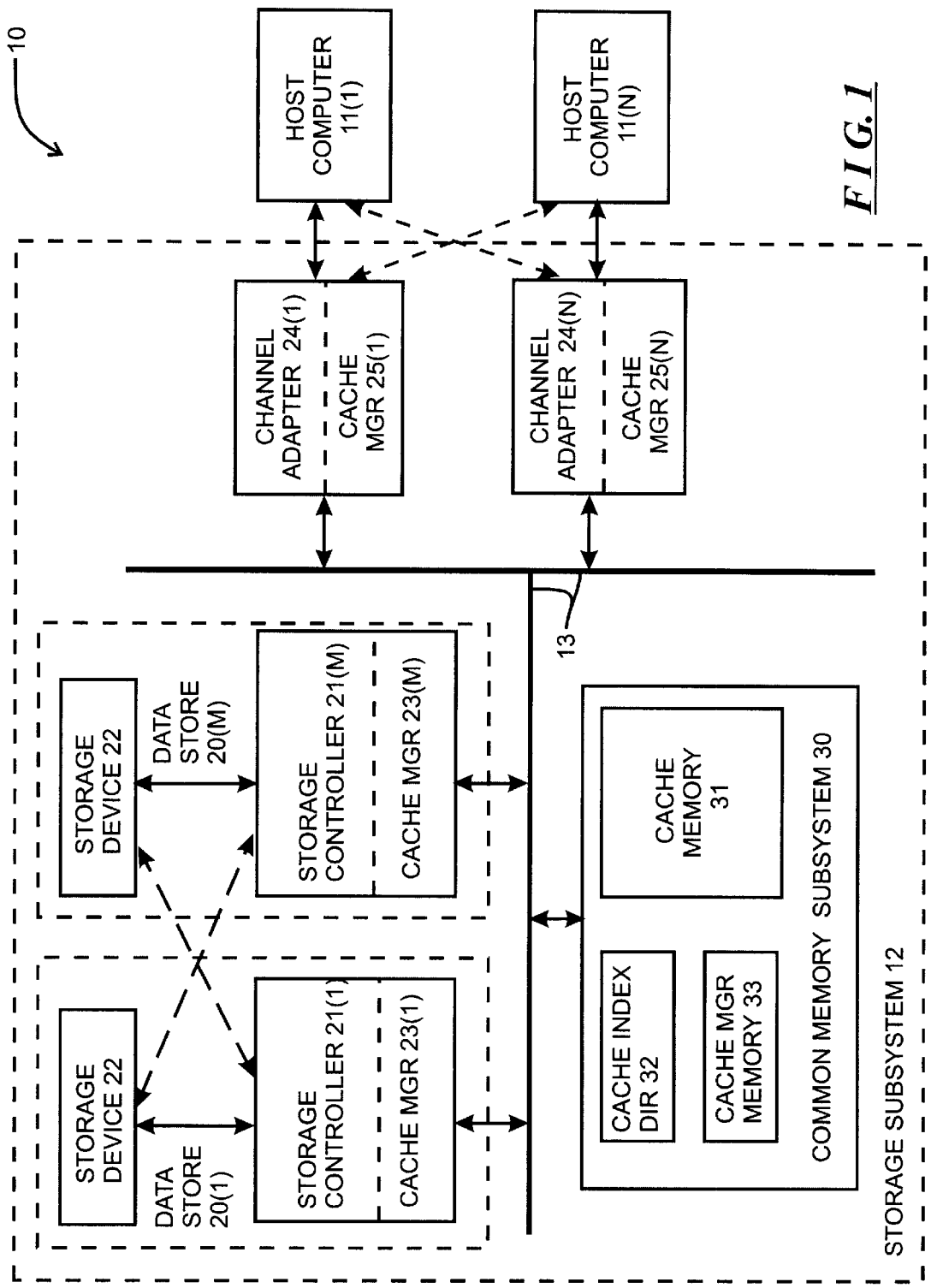
FIG. 1 is a functional block diagram of a digital computer system, including a storage subsystem constructed in accordance with the invention.

The invention will be described in connection with a digital computer system 10 depicted in functional block diagram form in FIG. 1. With reference to FIG. 1, computer system 10 includes a plurality of host computers 11(1) through 11(N) (generally identified by reference numeral 11(n)) and a digital data storage subsystem 12 interconnected by a common bus 13. Each host computer 11(n) may comprise, for example, a personal computer, workstation, or the like which may be used by a single operator, or a multi-user computer system which may be used by a number of operators. Each host computer 11(n) is connected to an associated channel adapter 24(n), which, in turn, is connected to bus 13. Each host computer 11(n) may control its associated channel adapter 24(n) to perform a retrieval operation, in which the channel adapter 24(n) initiates retrieval of computer programs and digital data (generally, "information") from the digital data storage subsystem 12 for use by the host computer 11(n) in its processing operations. In addition, the host computer 11(n) may control its associated channel adapter 24(n) to perform a storage operation in which the channel adapter 24(n) initiates storage of processed data in the digital data storage subsystem 12. Generally, retrieval operations and storage operations in connection with the digital data storage subsystem 12 will collectively be referred to as "access operations."

In connection with both retrieval and storage operations, the channel adapter 24(n) will transfer access operation command information, together with processed data to be stored during a storage operation, over the bus 13. Access to the bus 13 is controlled by bus access control circuitry which, in one embodiment, is integrated into the respective channel adapters 24(n). The bus access control circuitry arbitrates among devices connected to the bus 13 which require access to the bus 13. In controlling access to the bus 13, the bus access control circuitry may use any of a number of known bus access arbitration techniques.

The digital data storage subsystem 12 in one embodiment is generally similar to the digital data storage subsystem described in U.S. Pat. No. 5,206,939, entitled System And Method For Disk Mapping And Data Retrieval, issued Apr. 27, 1993 to Moshe Yanai, et al (hereinafter, "the '939 patent"). As shown in FIG. 1, the digital data storage subsystem 12 includes a plurality of digital data stores 20(1) through 20(M) (generally identified by reference numeral 20(m)), each of which is also connected to bus 13. Each of the data stores 20(m) stores information, including programs and data, which may be accessed by the host computers 11(n) as well as processed data provided to the digital data storage subsystem 12 by the host computers 11(n).

Each data store 20(m), in turn, includes a storage controller 21(m) and one or more storage devices generally identified by reference numeral 22. The storage devices 22 may comprise any of the conventional magnetic disk and tape storage devices, as well as optical disk storage devices and CD-ROM devices from which information may be retrieved. Each storage controller 21(m) connects to bus 13 and controls the storage of information which it receives thereover in the storage devices connected thereto. In addition, each storage controller 21(m) controls the retrieval of information from the storage devices 22 which are connected thereto for transmission over bus 13. In one embodiment, each storage controller 21(m) also includes bus access control circuitry for controlling access to bus 13.

The digital data storage subsystem 12 also includes a common memory subsystem 30 for caching information during an access operation and event status information providing selected status information concerning the status of the host computers 11(n) and the data stores 20(m) at certain points in their operations. The caching of event status information by the common memory subsystem 30 is described in detail in U.S. patent application Ser. No. 08/532,240, filed Sep. 25, 1995, in the name of Eli Shagam, et al., and entitled "Digital Computer System Including Common Event Log For Logging Event Information Generated By A Plurality of Devices," assigned to the assignee of the present invention and incorporated herein by reference. The information cached by the common memory subsystem 30 during an access operation includes data provided by a host computer 11(n) to be stored on a data store 20(m) during a storage operation, as well as data provided by a data store 20(m) to be retrieved by a host computer 11(n) during a retrieval operation. The common memory subsystem 30 effectively operates as a buffer to buffer information transferred between the host computers and the data stores 20(m) during an access operation.

The common memory subsystem 30 includes a cache memory 31, a cache index directory 32 and a cache manager 33, which are generally described in the '939 patent. The cache memory 31 operates as a buffer in connection with storage and retrieval operations, in particular buffering data received from the host computers 11(n) to be transferred to the storage devices for storage, and buffering data received from the data stores 20(m) to be transferred to the host computers 11(n) for processing.

Figure 2:
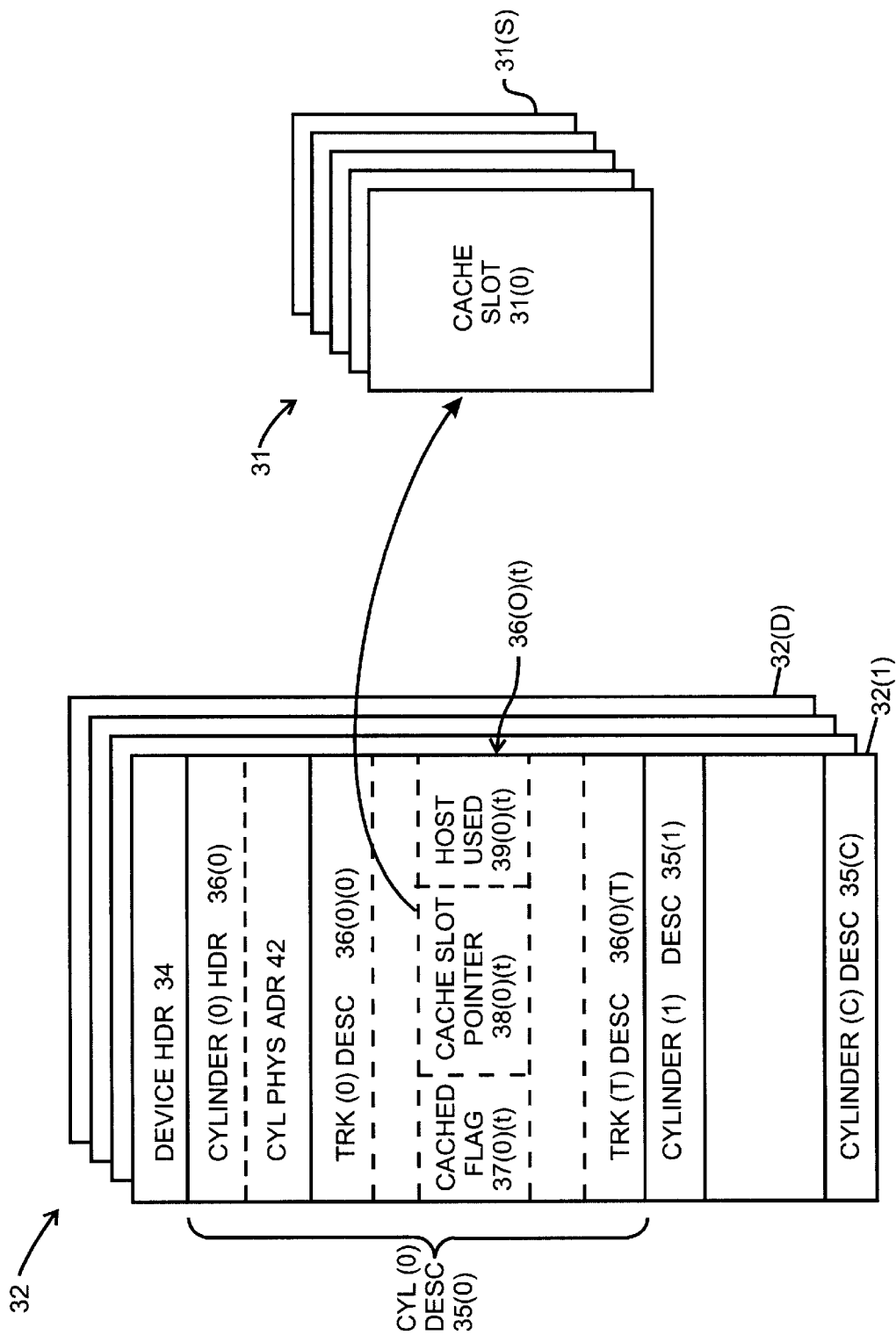
FIG. 2 depicts the organization of a cache memory and cache index directory useful in understanding the operation of the storage subsystem depicted in FIG. 1.

The cache memory 31 and cache index directory 32 will generally be described in connection with FIG. 2. With reference to FIG. 2, the cache memory 31 includes a series of storage locations, which are organized in a series of cache slots 31(0) through 31(S) (generally identified by reference numeral 31(s)). The storage locations are, in turn, identified by a series of addresses, with the starting address of a cache slot being identified by a base address. The cache slots 31(s), in turn, operate as the cache memory's buffer as described above.

The cache index directory 32 operates as an index for the cache slots 31(s) in the cache memory 31. The cache index directory 32 includes a plurality of cache index tables 32(0) through 32(D) (generally identified by reference numeral 32(d)), each of which is associated with a respective one of the storage devices 22 in the storage subsystem 12. The structure of the cache index table 32(d) associated with a storage device 22 is generally similar to that described in U.S. Pat. No. 6,029,229, entitled "Digital Data Storage Subsystem Including Directory For Efficiently Providing Formatting Information For Stored Records," issued Feb. 22, 2000, in the name of Natan Vishlitzky, assigned to the assignee of the present invention and incorporated herein by reference (hereinafter the "Vishlitzky application"), incorporated by reference, except as will be described herein. Generally, except as also described below, a copy of the cache index table 32(d) is stored on the storage device 22 with which it is associated. Each cache index table 32(d) includes a device header field 34, which provides, for example, selected identification and status information for the device 22 associated with the cache index table 32(d). In addition, each cache index table 32(d) includes a plurality of cylinder descriptors 35(1) through 35(C) (generally identified by reference numeral 35(c)) each of which is associated with one of the cylinders in the storage device 22 that is associated with the cache index table 32(d). Each cylinder descriptor 35(c), in turn, includes a cylinder header 36(c), which provides, for example, selected identification and status information for the cylinder associated with the cylinder descriptor 35(c). The cylinder header 36(c) includes a cylinder physical address field 42, contains a value that correspond to a physical address for the track associated with the track descriptor 36(c)(t). The cylinder physical address fields 42 of the cylinder descriptors 35(c) of the cache index table 32(d) associated with a particular storage device 22 is provided only in the copy of the cache index table 32(d) for the storage device 22 as stored on that storage device 22.

In addition, each cylinder descriptor 35(c) includes a plurality of track descriptors 35(c)(0) through 35(c)(T) (generally identified by reference numeral 35(t)), each of which is associated with one of the tracks in the cylinder 35(c). Each track descriptor 35(c)(t), in turn, includes information for the associated track of the storage device 22, including whether a copy of the data stored on the track is cached in the cache memory 31, and, if so, the identification of the cache slot 31(s) in which the data is cached. As will be described below in greater detail, each track descriptor 35(c)(t) includes a cached flag and a cache slot pointer. The cached flag, if set, indicates that the data on the track associated with the track is cached in a cache slot 31(s), and the cache slot pointer 38(s)(t) identifies the particular cache slot in which the data is cached. In addition, each track descriptor 35(c)(t) includes a used flag 39(c)(t) which may be used to indicate whether the data, after being stored in the cache slot identified by the cache slot pointer, has been used by the host computer 11(n) during a retrieval operation. This "host used" flag may be used to determine whether the cache slot may be re-used for another access operation.

Each of the channel adapters 24(n) and each of the storage controllers 21(m) is associated with a cache manager 25(n) and 23(m), respectively, to access to the cache memory 31, cache index directory 32 and cache manager memory 33. The particular operations performed during an access operation will depend on a number of factors, including the type of access operation to be performed, whether or not the data from the particular track to be accessed is cached in the cache memory 31, and whether or not the data contained in a cache slot 31(s) has been modified or updated by a channel adapter's cache manager 25(n) during a storage operation. As described in the aforementioned Shagam application, the channel adapters 24(n) typically perform storage and retrieval operations in connection with data in the cache memory 31, and the storage controllers 21(m) perform "staging" and "de-staging" operations to transfer data in the storage devices 22 to the cache memory 31 for buffering (the staging operations) and to transfer data from the cache memory 31 to the storage devices 22 for storage (the de-staging operations).

In performing a staging and de-staging operation, a storage controller 21(m) can transfer data to and from the cache memory 31 in units of a record or a track. That is, during a staging operation, a storage controller 21(m) will transfer all of the data in a record or track, respectively, from a storage device 22 to a cache slot 31(s) in the cache memory 31, and, during a de-staging operation, a storage controller 21(m) will copy all of the data in a slot in the cache memory 31 to the record or track of the storage device 22 from which it was originally staged. If the storage controller 21(m) transfers data in units of a record, it can store the record in the cache slot 31(s) that corresponds to the record's offset into the respective track as stored on the respective storage device 22. In that case, if, after storage controller 21(m) stores data from one record from a track in the cache slot 31(s) during a staging operation, the storage controller 21(m) is to engage in a staging operation in which it is to stage data from another record from the same track, it can store the second record in the same cache slot 31(s), but at an offset into the cache slot 31(s) that is appropriate for the second record. Similarly, if the storage controller 21(m) is to engage in a de-staging operation in connection with one or more records stored a cache slot 31(s), it can transfer the record(s)s to the respective storage device 22 for storage in the appropriate location(s), at the appropriate offset(s) in the respective track.

The cache manager memory 33 maintains a number of work lists which are used to control operations by the channel adapters 24(n) and storage controllers 21(m) during an access operation. In particular, the cache manager memory 33 includes a cache slot replacement list, a pending write list and various lists which the channel adapters 24(n) and storage controllers 21(m) use to communicate to coordinate staging operations (not shown). It will be appreciated that the various lists maintained by the cache manager memory 33 may comprise any of a number of convenient forms, including queues, trees, stacks or the like. The cache slot replacement list is used to control re-use of cache slots during staging operations in accordance with a convenient cache-slot re-use methodology. During a staging operation, the storage controller's cache manager 23(m) uses the cache slot replacement list to select a cache slot 31(s) into which it will load the data retrieved from a storage device. (The aforementioned Shagam application describes a modified least-recently-used cache-slot re-use methodology used in one embodiment of the invention). The pending write list is used to identify cache slots 31(s) which contain updated data, which has not been written to a storage device. During de-staging operations, the storage controllers' cache managers 23(m) will use the write pending list to identify cache slots to be written to a storage device 22. Preferably, the cache slots 31(s) which are identified in the pending write list will not also be listed in the cache slot replacement list, so that cache slots 31(s) which contain updated data will not be used until the data has not been written to a storage device through a de-staging operation.

The staging operation coordination communication lists include a plurality of stage request lists and a plurality of stage completion lists, with one stage request list being associated with each data store 20(m) and one stage completion list being associated with each host computer 11(n). The channel adapters' cache managers 25(m) use the stage request lists to store stage requests to be performed by the respective data stores 20(m), and the data stores' cache managers 23(n) use the stage completion lists to store stage completion messages to indicate to the respective channel adapters' cache managers 25(m) that the stage requests have been completed.

Generally, a channel adapter 24(n), during a retrieval operation, attempts to retrieve the data from the cache memory 31. However, if the data is not in the cache memory 31, it will enable the storage controller 21(m) which controls the storage device 22 that contains the data to be retrieved to "stage" the track which contains the data to be retrieved, that is, to transfer all of the data in the track which contains the data to be retrieved into a slot in the cache memory 31. After the data to be retrieved is in a slot in the cache memory 31, the channel adapter 24(n) will retrieve the data from the slot. Similarly, during a storage operation, the channel adapter 24(n) will determine whether the particular track into which the data is to be written is in a slot in the cache memory 31 and if so will store the data in the slot. However, if the data is not in the cache memory 31, the channel adapter 24(n) will enable the cache manager 23(m) and storage controller 21(m) which controls the storage device 22 that contains the track whose data is to be updated to perform a staging operation in connection with the track, thereby to transfer the data in the track into a slot in the cache memory 31. After the data from the track has been copied into the cache memory 31, the channel adapter 24(n) will update the data in the track.

The storage controller 21(m) generally attempts to perform a staging operation in connection with an empty slot in the cache memory 31. However, if the storage controller 21(m) may find that all of the cache slots in the cache memory 31 are filled, it will in any case select one of the slots to be used with the staging operation. Before transferring the data from the track to the selected cache slot, it will determine whether the data in the slot has been updated by a storage operation, and if so copy the data to the storage device 22 in a de-staging operation, and thereafter perform a staging operation to copy the data from the storage device to the selected cache slot. It will be appreciated that the storage controller 21(m) need only perform a de-staging operation in connection with a cache slot if the data in the cache slot has been updated, since if the data in the cache slot not been updated before the slot is re-used (which may occur if the channel adapter 24(n) has only performed retrieval operations therewith), the data in the cache slot corresponds to the data in the storage device 22.

More specifically, as described in the aforementioned Shagam application, during a retrieval operation, the cache manager 25(n) of the initiating channel adapter 24(n) will initially access the cache index table 32(d) in the cache index directory 32 associated with the storage device 22 in which the data to be retrieved is stored, in particular accessing the track descriptor 36(c)(t) of the cylinder descriptor 36(c) to determine, from the condition of the cached flag, whether the data from the track is cached in a cache slot 31(s) in the cache memory. If the cached flag indicates that data from the track is cached in a cache slot 31(s), the cache manager 25(n) uses the cache slot pointer 38(t) to identify the particular cache slot 31(s) in which the data is cached and retrieves the required data from the cache slot 31(s).

On the other hand, if the cache manager 25(n) determines from the cached flag that the data from the track is not cached in a cache slot 31(s), it will generate a stage request to enable the storage controller 21(m) for the storage device 22 which maintains the data to be retrieved, load the stage request in the stage request queue for the data store 21(m) and notify the storage controller 21(m) that a stage request had been loaded in the stage request queue. At some point after receiving the notification, the storage controller 21(m) will retrieve the stage request and perform a staging operation in response thereto. In performing the staging operation, the storage controller 21(m) will retrieve the data from the requested track, use the above-described cache slot replacement list to select a cache slot 31(s), load the data into cache slot 31(s) and update the track descriptor 36(c)(t) in the cache index table 32(d) associated with the storage device 22 to indicate that the data from the track is in the cache slot 31(s), in particular setting the cached flag and loading a pointer to the cache slot in the cache slot pointer.

After the storage controller 21(m) has completed the staging operation, it will load a staging completed message in the stage completion list in the cache manager memory 33 associated with the host computer 11(n) which issued the staging request, and notify the host computer's cache manager 25(n) that a stage completed message has been loaded therein. At some point after receiving the notification, the host computer's cache manager 25(n) can repeat the operations performed in connection with the retrieval request as described above, in particular accessing the cache index table 32(d) in the cache index directory 32 associated with the storage device 22 in which the data to be retrieved is stored, in particular accessing the track descriptor 36(c)(t) of the cylinder descriptor 36(c) to determine, from the condition of the cached flag, whether the data from the track is cached in a cache slot 31(s) in the cache memory and, if so, use the cache slot pointer 38(t) to identify the particular cache slot 31(s) in which the data is cached and retrieve the required data from the cache slot 31(s). Since at this point the cached flag should indicate that the data from the track is cached in a cache slot 31(s), the channel adapter's cache manager 25(n) should be able to complete the retrieval operation.

Similar operations occur during a storage operation, in which data in a particular track is updated, with the additional operation of removing the identification of the cache slot 31(s) containing data to be updated from the replacement list and loading it into the pending write list. During a storage operation, the cache manager 25(n) of the initiating channel adapter 24(n) will initially access the cache index table 32(d) in the cache index directory 32 associated with the storage device 22 in which the data to be updated is stored, in particular accessing the track descriptor 36(c)(t) of the cylinder descriptor 36(c) to determine, from the condition of the cached flag, whether data from the track is cached in a cache slot 31(s) in the cache memory. If the cached flag indicates that data from the track is cached in a cache slot 31(s), the cache manager 25(n) uses the cache slot pointer 38(t) to identify the particular cache slot 31(s) in which the data is cached and loads the updated data into the cache slot 31(s) at an offset into the cache slot that is appropriate for the respective record whose data is being updated. In addition, the channel adapter's cache manager 25(n) will remove the identification of the selected cache slot 31(s) from the replacement list to the pending write list so that the cache slot 31(s) will not be re-used until a de-staging operation has been performed in connection with the cache slot 31(s).

On the other hand, if the cache manager 25(n) determines from the cached flag 36(c)(t) that the data from the track is not cached in a cache slot 31(s), it will generate a stage request to enable the storage controller 21(m) for the storage device 22 which maintains the data to be retrieved, load the stage request in the stage request queue for the data store 21(m) and notify the storage controller 21(m) that a stage request had been loaded in the stage request queue. At some point after receiving the notification, the storage controller 21(m) will retrieve the stage request and perform a staging operation in response thereto. In performing the staging operation, the storage controller 21(m) will retrieve the data from the requested track, select a cache slot 31(s), load the data into cache slot 31(s) and update the track descriptor 36(c)(t) in the cache index table 32(d) associated with the storage device 22 to indicate that the data from the track is in the cache slot 31(s), in particular setting the cached flag and loading a pointer to the cache slot in the cache slot pointer.

After the storage controller 21(m) has completed the staging operation, it will load a staging completed message in the stage completion queue in the cache manager memory 33 associated with the host computer 11(n) that issued the staging request, and notify the cache manager 25(n) that a stage completed message has been loaded therein. At some point after receiving the notification, the cache manager 25(n) can repeat the operations performed in connection with the retrieval request as described above, in particular access the cache index table 32(d) in the cache index directory 32 associated with the storage device 22 in which the data to be retrieved is stored, access the track descriptor 36(c)(t) of the cylinder descriptor 36(c) to determine, from the condition of the cached flag, whether the data from the track is cached in a cache slot 31(s) in the cache memory and, if so, use the cache slot pointer 38(t) to identify the particular cache slot 31(s) in which the data is cached and retrieve the required data from the cache slot 31(s). Since at this point the cached flag should indicate that the data from the track is cached in a cache slot 31(s), the cache manager 25(n) should be able to complete the storage operation as described above.

As described above, the data stores' cache managers 23(m) also perform de-staging operations using the pending write list to identify cache slots 31(s) that contain updated data to be written back to the original storage device 22 and track whose data was cached in the respective cache slots 31(s). When a cache slot 31(s) is de-staged, since at that point the data in the cache slot 31(s) corresponds to the data on the respective storage device 22, the data store's cache manager 23(m) which performs the de-staging operation will remove the cache slot's identification from the pending write list and return it to the replacement list so that the cache slot 31(s) can be removed. It will be appreciated, however, that a host computer's cache manager 25(n) may perform a number of retrieval operations and/or storage operations in connection with data in the same cache slot 31(s) after the data in the track cached in the slot has been staged and before it can be de-staged, and so data in a cache slot 31(s) can be updated a number of times before it is de-staged. In addition, it will be appreciated that after data in a cache slot 31(s) has been de-staged, it may also be updated during a storage operation before the cache slot 31(s) is re-used during a staging operation. When that occurs however, since, as described above, the host computer's cache manager 25(m) removes the cache slot's identification from the replacement list and placed it on the write pending list as part of the storage operation, the cache slot 31(s) will be subject to another de-staging operation before it can be re-used. Thus, a particular cache slot 31(s) may be subject to de-staging a number of times with data cached for the same storage device 22, cylinder and track, without being reused.

The invention in one aspect provides an arrangement for compactly providing information in the cache index tables 32(d) for the respective storage devices 22 to efficiently accommodate use of storage devices 22 which can store relatively high-density data and reduce the amount of information which would otherwise need to be stored. This is accommodated in part by, as noted above, providing that the cylinder physical address field 42 of each cylinder header 36(c) in the cache index table 32(d) for a storage device will only be stored in the copy of the cache index table 32(d) stored on the associated storage device 22, and not in the copy that is stored in the cache index directory 32. Check this next In addition, other information, forming part of each track descriptor 36(c)(t), will also be stored only in the copy of the cache index table 32(d) stored on the associated storage device 22, and not in the copy that is stored in the cache index directory 32. This will be described in connection with FIG. 3, which depicts the structure of a track descriptor, identified by reference numeral 36(c)(t), for use in connection with one embodiment of the invention. Since some information in the cache index table 32(d) associated with a storage device 22 is stored only on the storage device, and not in the cache index directory 32, for a given number of storage devices 22, increased numbers of cylinder descriptors 35(c) per storage device 22, and/or increased numbers of track descriptors 36(c)(t) per cylinder, can be stored in the cache index directory 32. In one embodiment, for each cylinder descriptor 35(c), the cylinder physical address field 42 is eight bytes and the other information in the cache index table 32(d) that is stored only on the storage device, as will be described below, is another eight bytes, in which case the size of each cylinder descriptor 35(c) in the cache index table 32(d) as stored in the cache index directory 32 will be sixteen bytes smaller than as stored on the respective storage device 22. This will allow the cache index directory 32 to accommodate increased numbers of cylinder descriptors 35(c) for each device 22, increased numbers of track descriptors 36(c)(t) for each cylinder, or both.

Figure 3:
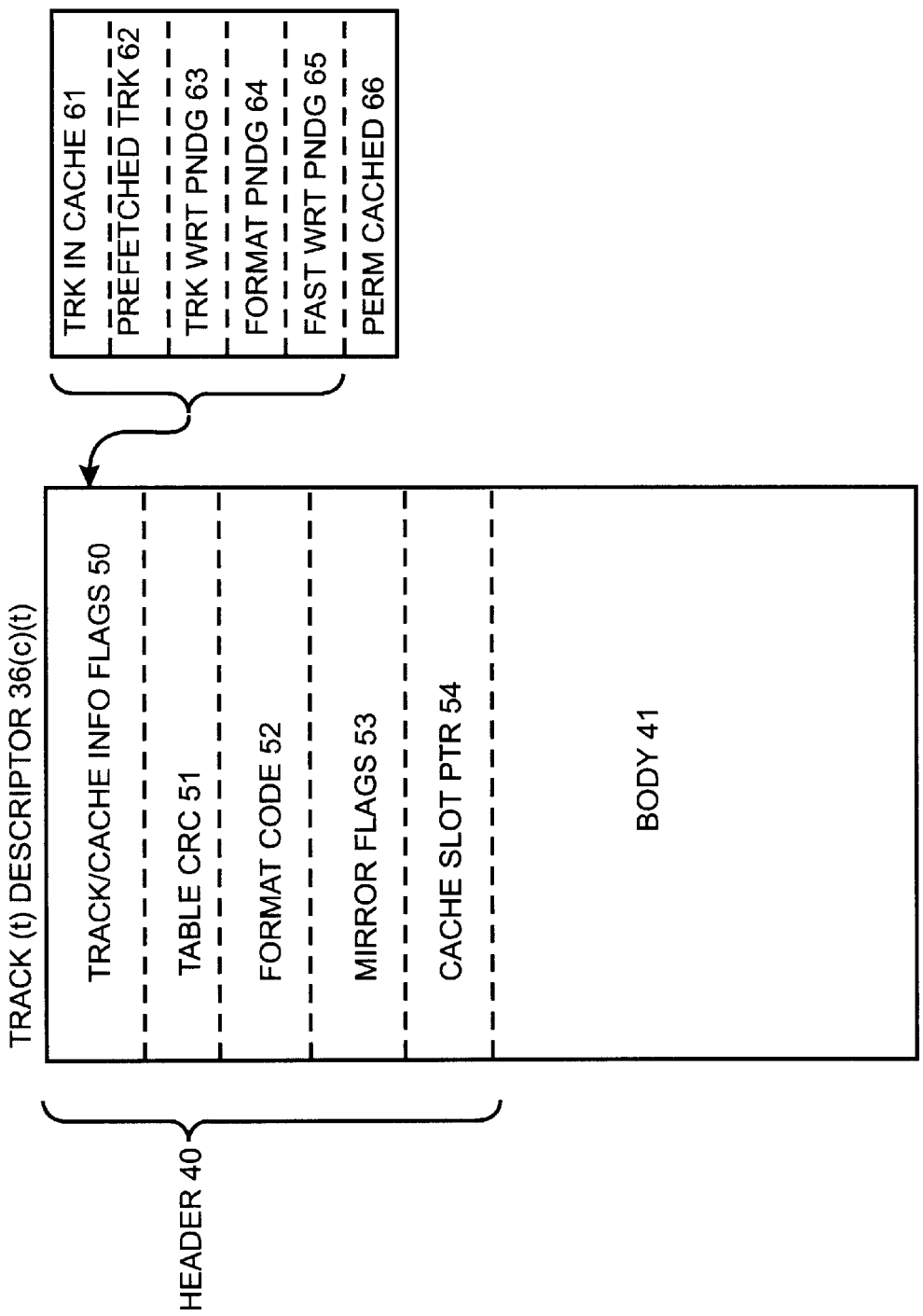
FIG. 3 depicts the structure of a descriptor, useful in the cache memory depicted in FIG. 2, the descriptor providing formatting information for information stored by the storage subsystem.

With reference to FIG. 3, the track descriptor 36(c)(t) includes a header 40 and a body section 41. The header 40 includes information about the track, including such information as whether the track is cached in the cache memory 31 and, if so, a pointer to the cache slot 31(s) in which the track is cached. In addition, the header 40 indicates whether mirror copies exist for the track on other digital data storage systems. The body 41, on the other hand, contains record-specific format information for the respective records in the track. In one embodiment, the records are of fixed-length, such as one or more blocks or sectors (generally referred to as "sectors"), and each track comprises a predetermined number of such sectors.

More specifically, the header 40 includes a number of flags and fields as shown in FIG. 3, including a track/cache information flags field 50, a table CRC field 51, an extended format code field 52, a mirror flags field 53, and a cache slot pointer field 54. The track/cache information flags field 50 includes several flags, including a track in cache flag 61, a prefetched track flag 62, a track write pending flag 63, a format pending flag 64, a fast write pending flag 65, and a permanently cached track flag 66, all of which are used in managing caching in connection with the track. The track in cache flag 61, which corresponds to the cached flag 37(c)(t) described above in connection with FIG. 2. If the track in cache flag is set, the track is currently cached in the cache memory 31; when that occurs, the cache slot pointer field 54, which corresponds to the cache slot pointer 38(c)(t) described above in connection with FIG. 2, contains a pointer that identifies the cache slot 31(s) in which the track is cached. The prefetched track flag 62, if set, indicates that the data store's cache manager 23(m) prefetched the track and loaded it in the cache memory 31 before it was requested to do so by a channel adapter's cache manager 25(n). Generally, a cache manager 23(m) may prefetch a particular track if a channel adapter's cache manager 25(n) initiates a series of staging operations for a series of preceding tracks, which can indicate that the program being processed by the associated host computer 11(n) will likely also request that the particular track be staged. The permanently cached track flag 66 of the track/cache information flags field 50 is set if the track is to be permanently cached in a cache slot 31(s) and not to be overwritten. A host computer's cache manager 25(n) may request that a track be permanently cached if the program being processed by the associated host computer is expected to access the records in the track frequently.

The track write pending flag 63 is used to indicate that the information in a cache slot 31(s) has been updated by a host computer 11(n) and needs to be de-staged to the associated track by a data store 20(m). While the write pending flag is set, to indicate that a de-staging operation is to be performed, the cache slot 31(s) in which information for the track has been cached will not be used for another track until the de-staging operation has been completed. It will be appreciated that, if the permanently cached track flag 66 is also set, after the de-staging operation the cache slot 31(s) will not be used for another track, but instead the information for the track will remain in the cache slot 31(s) as long as the permanently cached track flag 66 is set.

The format pending flag 64 is used to indicate that, if the track write pending flag 63 is set indicating that information for the track has been updated by a host computer 11(n), the update is such that the record structure for a record has changed. Generally, host computer 11(n) can indicate that an update will be such that the record structure for a record will change by providing a "format pending" storage command to its associated channel adapter 24(n), along with the updated information that is to be stored during the storage operation. If the format pending flag 64 is set, the format code in the format code field 52 of the track descriptor 36(c)(t) associated with the track may also be updated to indicate a new format code for the track, and the record-specific format information for the respective records in the track in the body 41 may also be updated to indicate the record specific format information. It will be appreciated that, the record structure may be changed so that the track includes more or fewer records, and, with the updating of a particular record on the track, the record may be larger or smaller than prior to the update. After the information for the record has been updated in the cache slot 31(s), the format code in the format code field format code field 52 and the record-specific format information in the body 41 can be updated to reflect the new format.

The fast write pending flag 65 will be set if a fast write operation is pending for the track associated with the track descriptor 36(c)(t). In a fast write operation, the data in the cache slot 31(s) will may be updated one or more times before the track write pending flag 63 is set to control de-staging of the track. Generally, host computer 11(n) can initiate a fast write operation by providing a "fast write" storage command to its associated channel adapter 24(n), along with the updated information that is to be stored for at least the first update. The host computer 11(n) can thereafter provide update information to update information on the track one or more times by providing appropriate storage commands, also along with the updated data to be stored. After the host computer has provided all of the information updates that it is to provide during the fast write operation, or contemporaneous with the final information update, the host computer 11(n) will issue a "commit" storage command, after which the track can be de-staged from the respective cache slot 31(s). Following receipt of the fast write command in connection with a record on a particular track, the channel adapter 24(n) will set the fast write pending flag 65, but not the track write pending flag 63, in the track descriptor 36(c)(t) for the respective track. Following receipt of the commit command, the channel adapter 24(n) will clear the fast write pending flag 65, set the write pending flag 36 and perform other operations that might be necessary to enable the track to be de-staged.

It will be appreciated that, if information is transferred between the storage devices 22 and the cache slots 31(s) in units of records, in addition to a track in cache flag 61, the track descriptor 36(c)(t) can include, in addition to or instead of each of flags 61 through 66, a flag for each record. In that case, for example, the track descriptor 36(c)(t) would include a record in track flag (not shown) for each record which can be set to indicate that the associated record is in the cache slot 31(s) pointed to by the cache slot pointer 54.

The table CRC field 51 of the track descriptor 36(c)(t) stores a CRC value that corresponds to the cyclical redundancy check ("CRC") value for the track descriptor 36(c)(t). The CRC value can be generated from the information in the other fields 50, and 52–54 and the body section 41 using any convenient CRC algorithm, and can be used to verify the information in those fields 50 and 52–54 and that section 41.

The extended format code field 52 can be used to identify one of a plurality of extended format definitions for the records stored on the track, and the body section 41 contains further record formatting information for the records. In one embodiment, sixteen record formats are defined, in which case the extended format code field 52 can be accommodated by four bits. The cache managers 23(m) can use the record format definition for the respective track as set forth in the body section 41 of the track descriptor 36(c)(t) for a track to identify the locations of particular records on the track which are to be retrieved during a staging operation the location in the particular cache slot 31(s) in the cache memory 31 in which they are to be stored. Similarly, during a de-staging operation, the cache managers 23(m) can use the record format definition for the respective track to identify the location in the cache slot of records which have been updated and are to be de-staged and the corresponding locations in the track in which they are to be stored during the de-staging operation. In addition, the channel adapters 24(n) can use the record format definition for the respective track as set forth in the body section 41 to locate the locations of records from the track, as stored in the cache slot 31(s), which are to be retrieved during a retrieval operation, and in which data is to be stored during a write operation.

The mirror flags field 53 contains one or more flags indicating whether the track has been mirrored on one or more other digital data storage subsystems, and, if so, whether the mirrors are up-to-date. In one embodiment, the digital data storage subsystem 12 is one of four in a cluster of digital data storage subsystems which serves to provide mirrors for each other, and the flags in the mirror flags field 53 indicates both on which of the digital data storage subsystems the track is mirrored, and the update status of the track on each of those digital data storage subsystems. The digital data storage subsystem can use the mirror flags 53 to verify that, if a track is mirrored, all of the mirrors are maintained in an updated and synchronous condition.

As noted above, the body section 41 contains extended format definitions for records in the track. In one embodiment, sixteen extended format definitions have been defined, with the particular extended format definition being used in connection with a track being identified by the extended format code field 32 of the track descriptor 36(c)(t). The extended formats and extended format definitions used in one embodiment of the invention are described in the aforementioned Vishlitzky patent application and will not be described further herein.

As further noted above, a copy of the cache index table 32(d) associated with a respective storage device 22, except for the cylinder physical address fields 42 of the respective cylinder descriptors 35(c), will be stored both in the cache index directory 32 and the respective storage device 22. The cylinder physical address fields 42 will be stored on the copy of the cache index table 32(d) that is stored on the respective storage device 22, but not on the copy of the cache index table 32(d) that is stored in the cache index directory 32. That allows space in the cache index directory 32 to be freed up, allowing more cache index tables 32(d) and/or more cylinder descriptors 35(c) per cache index tables 32(d) to be stored a particular amount of storage space in the cache index directory.

As is apparent from the above, the storage controller 21(m) and channel adapter 24(n) will typically make use of the information in a cache index table 32(d) as stored in the cache index directory 32 in their operations, and can update the information in the cache index table 32(d) as stored in the cache index directory 32. For example, after a channel adapter 24(n) receives a retrieval request during a retrieval operation, the channel adapter 24(n) may need to make use of the information in a cache index table 32(d) that contains a track descriptor 36(c)(t) associated with a track containing a record from which information is to be retrieved, to determine, from the track in cache flag 61, whether information from the track is already cached in a cache slot 31(s). In addition, if storage controllers 21(m) transfer information to and from the cache memory 31 in units of a record, the channel adapter 24(n) can determine whether information from the record from which information is to be retrieved is already cached in the cache slot 31(s). If, for example, the track descriptor 36(c)(t) includes record in cache flags for the respective records in the track, the channel adapter 24(n) can use the record in cache flag associated with the record from which information is to be retrieved to determine whether the record is already cached in a cache slot 31(s).

If the channel adapter 24(n) makes a negative determination, that is, if it determines either that the track in cache flag 61 is not set, or the record in cache flag associated with the record from which information is to be retrieved is not set, it can generate a staging request to enable the respective storage controller 21(m) to stage the required information as described above. If the data is transferred from a storage device 22 to a cache slot 31(s) in units of a record, the channel adapter 24(n) may make use of the format code information in the format code field 52 and record-specific format information for the record from which information is to be retrieved in the body 41 to determine the offset into the track of the record from which information is to be retrieved and the size of the record, and provide that information in the staging request that it generates. Alternatively, the channel adapter 24(n) can, in the staging request that it generates, provide identifying information for the record; in that case, after the storage controller 21(m) receives the staging request, it can make use of the format code information in the format code field 52 and record-specific format information for the identified record in the body 41 to determine the offset into the track, and the size, of the record from which information is to be retrieved. In either case, after the storage controller 21(m) has determined the offset and size of the record from which information is to be retrieved, it can make use of the offset and size to control retrieval of the information from the respective storage device 22.

The storage controller 21(m) can store the information retrieved from the respective storage device 22 in a cache slot 31(s). Prior to doing actually storing the information in the cache slot 31(s), however, the storage controller 21(m) will identify the track whose information is stored in the cache slot 31(s) in which the retrieved information will be stored, and clear the track in cache flag 61 in the track descriptor 36(c)(t) that is associated with that track. If information is retrieved and stored in the cache slots 31(s) in units of a track, generally, as described above, the storage controller 21(m) will need to select a cache slot 31(s) in which the information is to be stored. In that case, in addition to storing the information in the selected cache slot 31(s), the storage controller 21(m) will set the track in cache flag 61 to indicate that information from the track is in the cache slot 31(s). In addition, the storage controller 21(m) will load a pointer to the cache slot 31(s) in which the storage controller 21(m) stored the information into the cache slot pointer field 54.

On the other hand, if information is retrieved and stored in units of a record, in storing the retrieved information in a cache slot 31(s), the storage controller 21(m) can determine whether information from at least one record from the same track is cached in a cache slot 31(s), and, if so, cache the retrieved information in the same cache slot. In that operation, the storage controller 21(m) can determine whether the information from at least one other record is cached in a cache slot 31(s) by determining whether either the track in cache flag 61 in the track descriptor 36(c)(t) is set, or any of the record in cache flags (not shown) in the track descriptor 36(c)(t) is set. If the storage controller 21(m) makes a positive determination in either case, information from at least one record from the track is cached in a cache slot 31(s), and the storage controller 31(s) will cache the newly-retrieved information in the same cache slot 31(s), making use of the cache slot pointer in the cache slot pointer field 54 of the track descriptor 36(c)(t) to identify the cache slot 31(s) in which the information is to be stored. In addition, the storage controller 21(m) will make use of the offset information for the record to determine the offset into the cache slot 31(s) at which the information retrieved from the record is to be stored. Furthermore, the storage controller 21(m) will set the record in track flag associated with the record whose information was stored in the cache slot 31(s). If, on the other hand, the storage controller 21(m) determines that no information from any other record is cached in any cache slot 31(s), it can select a cache slot 31(s) in which the newly-retrieved information is to be stored, and store the information in that cache slot 31(s). In that operation, the storage controller 21(m) will make use of the offset information for the record to determine the offset into the cache slot 31(s) at which the information retrieved from the record is to be stored. In addition, the storage controller will set the record in track flag associated with the record whose information was stored in the cache slot 31(s) and, if present, the track in track flag 61 in the respective track descriptor 36(c)(t), and load a pointer to the cache slot 31(s) in which the storage controller 21(m) stored the information into the cache slot pointer field 54 of the track descriptor 36(c)(t).

After the storage controller 21(m) has stored the information retrieved from a storage device 22 in a cache slot 31(s), it will provide a notification to the channel adapter 24(n) that the information has been staged into the cache slot 31(s).

If, after the channel adapter 24(n) receives a retrieval request, the channel adapter 24(n) determines that the track in cache flag 61 is set (or, if transfers are in units of records, the channel adapter 24(n) determines that the appropriate record in cache flag is set), or the channel adapter 24(n) has been notified that the information has been staged into a cache slot 31(s), it (that is, the channel adapter 24(n) will access the cache slot pointer in the cache slot pointer field 54 to determine the cache slot in which the information has been stored. Thereafter, the channel adapter 24(n) can retrieve the information whose retrieval was requested and provide it to the host computer 11(n) from which it received the retrieval request.

If, on the other hand, a channel adapter 24(n) receives a storage request from a host computer 11(n), it, and, as necessary, a storage controller 21(m) will perform operations similar to those described above in connection with a retrieval operation to initially enable information from the track or record that is to be updated to be stored in a cache slot 31(s). Thereafter, the channel adapter 24(n) will update the information in the cache slot 31(s). If the storage request includes a "format pending" storage command, the channel adapter 24(n) will set the format pending flag 64 and update the format code field 52 and the record-specific format information in the body 41 to reflect the updated record format. If the storage request is a request for a fast write pending operation, the channel adapter will set the fast write pending flag 66. On the other hand, if the storage request is or contains a "commit" storage command, it will clear the fast write pending flag 66 and set the track write pending flag 63. Finally, if the storage request is not a request for a fast write pending operation, the channel adapter 24(n) will determine whether the fast write pending flag 66 is set. If the channel adapter 24(n) determines that the fast write pending flag is not set, it will set the track write pending flag 63. If, on the other hand, the channel adapter 24(n) determines that the fast write pending flag 66 is set, it will not set the track write pending flag 63.

It will be appreciated that, if information is transferred in units of a record, and if the track descriptor 36(c)(t) includes separate flags 61–66 for each record, the channel adapter 24(n) can condition the respective flag associated with the record for which the storage request was received.

The storage controllers 21(m) also use the track descriptors 36(c)(t) during de-staging operations. If, for example, a storage controller 21(m) is to perform a de-staging operation in connection with a track, information from which is cached in a cache slot 31(s), the storage controller 21(m) will determine from the cache slot pointer 54 the cache slot 31(s) in which the information is stored. If information is transferred in units of a track, the storage controller 21(m) will transfer the information from the cache slot 31(s) to the respective storage device 22 for storage. After information from the cache slot 31(s) has been transferred to the storage device 22 for storage, the storage controller 21 will clear the track write pending flag 63 and the format pending flag 65 if that flag is set. The storage controller 21(m) will not clear the track in cache flag 61 for the track at this point. Instead, as noted above, the storage controller 21(m) will clear the track in cache flag 61 when the cache slot 31(s) in which the information from the track is cached when the cache slot 31(s) is used for another track. In that case, if a channel adapter 24(n) receives either a retrieval or a storage request for the track before the cache slot 31(s) that contains information for the track is used for information from another track, the channel adapter 24(n) will determine that the information for the earlier track is still in the cache slot 31(s), thereby avoiding the necessity of staging information from that track again.

It will be appreciated that, if information is transferred in units of a record, the storage controller 21(m) will make use of the format code in format code field 52 and the record-specific format information in the body 41 to determine the offset(s) and length(s) of the record(s) that are to be transferred to the respective storage device 22 for storage, and will clear the record write pending flag(s) for the records for which information is to be updated, as well as the record format pending flag(s) for the records if that flag is set. The storage controller 21(m) can identify the record(s) for which information is to be updated using, for example, the flags associated with the respective records.

As noted above, a copy of the cache index table 32(d) associated with a respective storage device 22, except for the contents of the cylinder physical address fields 42 in the various cylinder descriptors 35(c) of the cylinder descriptors, is stored on the respective storage device 22. It will be apparent from the above that the track descriptor 36(c)(t) portions of a cache index table 32(d) can be updated a number of times during both a retrieval operation and a storage operation. To reduce the number of times that a cache index table 32(d) as stored in the cache index directory 32 will be transferred to the respective storage device 22 for storage, the storage controller 21(m) typically will only transfer the cache index table 32(d) when a portion of a track descriptor 36(c)(t) relating to the information as stored on, or to be stored on, the respective track is updated, and not when control information in the respective track descriptor 36(c)(t) is updated. Thus, for example, if the format code in format code field 52 and/or the record-specific format information in body 41 is updated in the copy of a track descriptor 36(c)(t) in a cache index table 32(d) as stored in the cache index directory 32, the storage controller 21(m) will transfer the track descriptor 36(c)(t) from the cache index directory 32 to the respective storage device 22 for storage. On the other hand, if control information, such as a flag 61–66 is updated, the storage controller 21(m) will not transfer the track descriptor 36(c)(t) from the cache index directory 32 to the respective storage device 22 for storage.

Figure 5A:
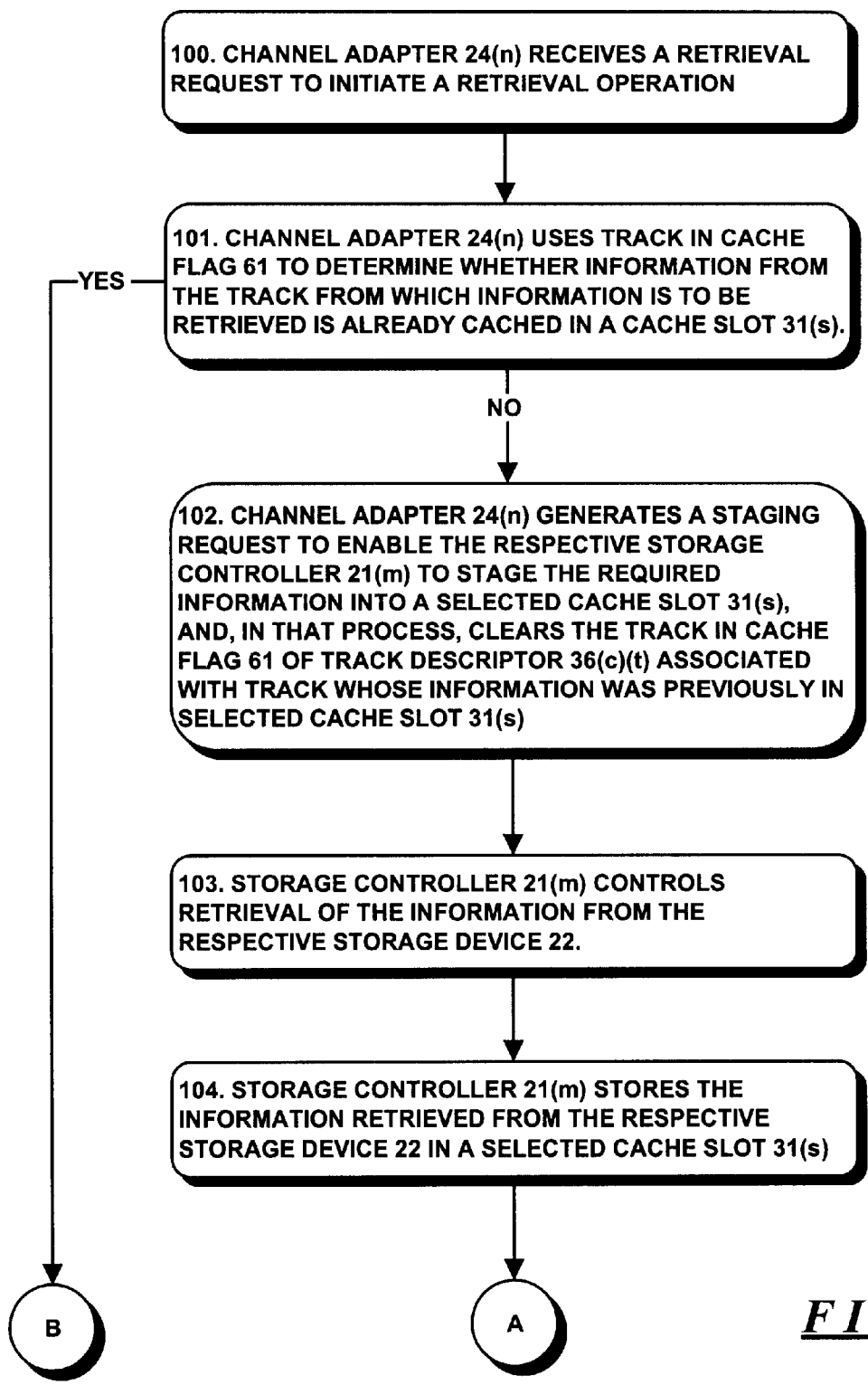
FIG. 5 depicts a flow chart of operations performed by the storage subsystem in connection with usage of the descriptor described in connection with FIGS. 2 and 3.
Figure 5B:
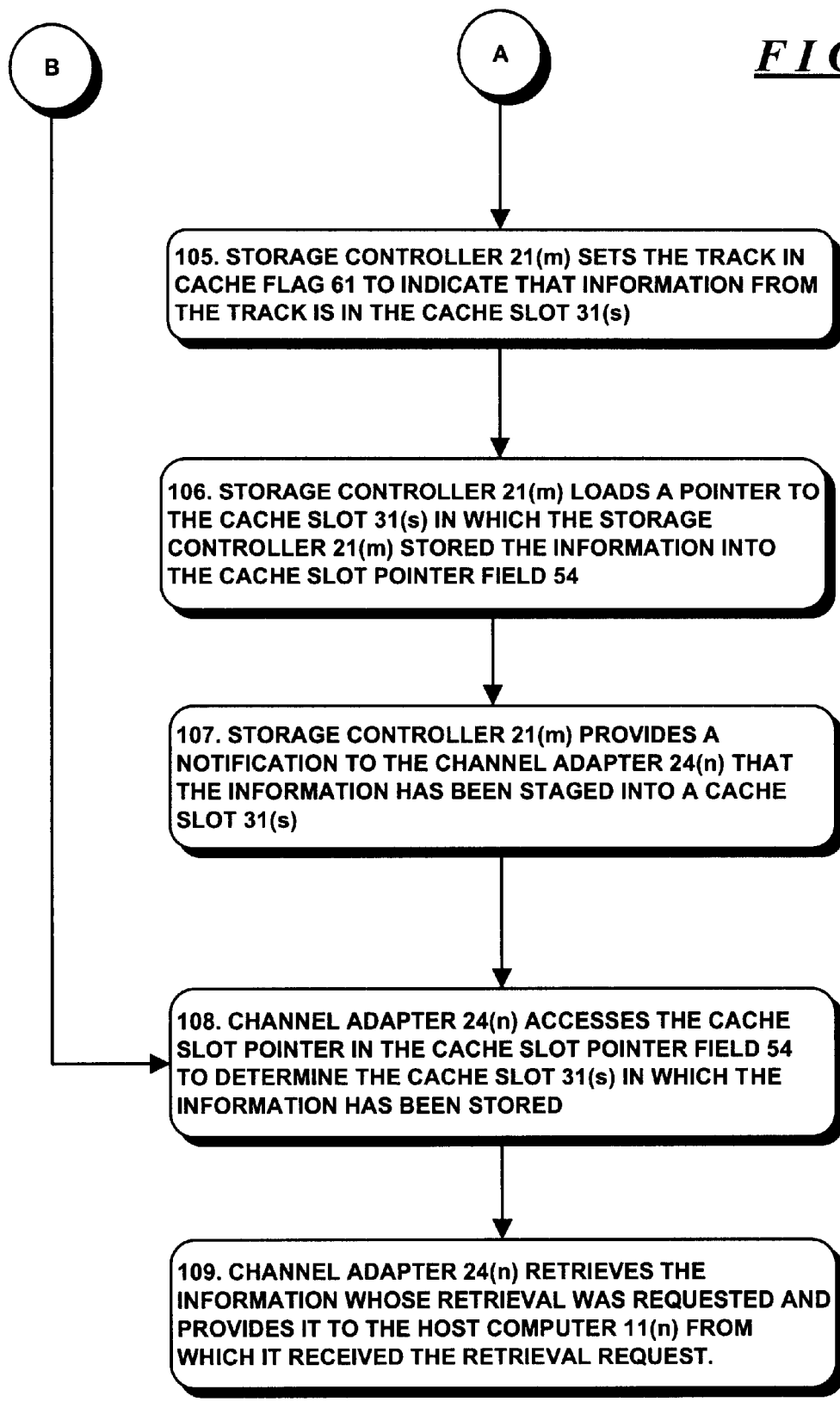
Figure 5C:
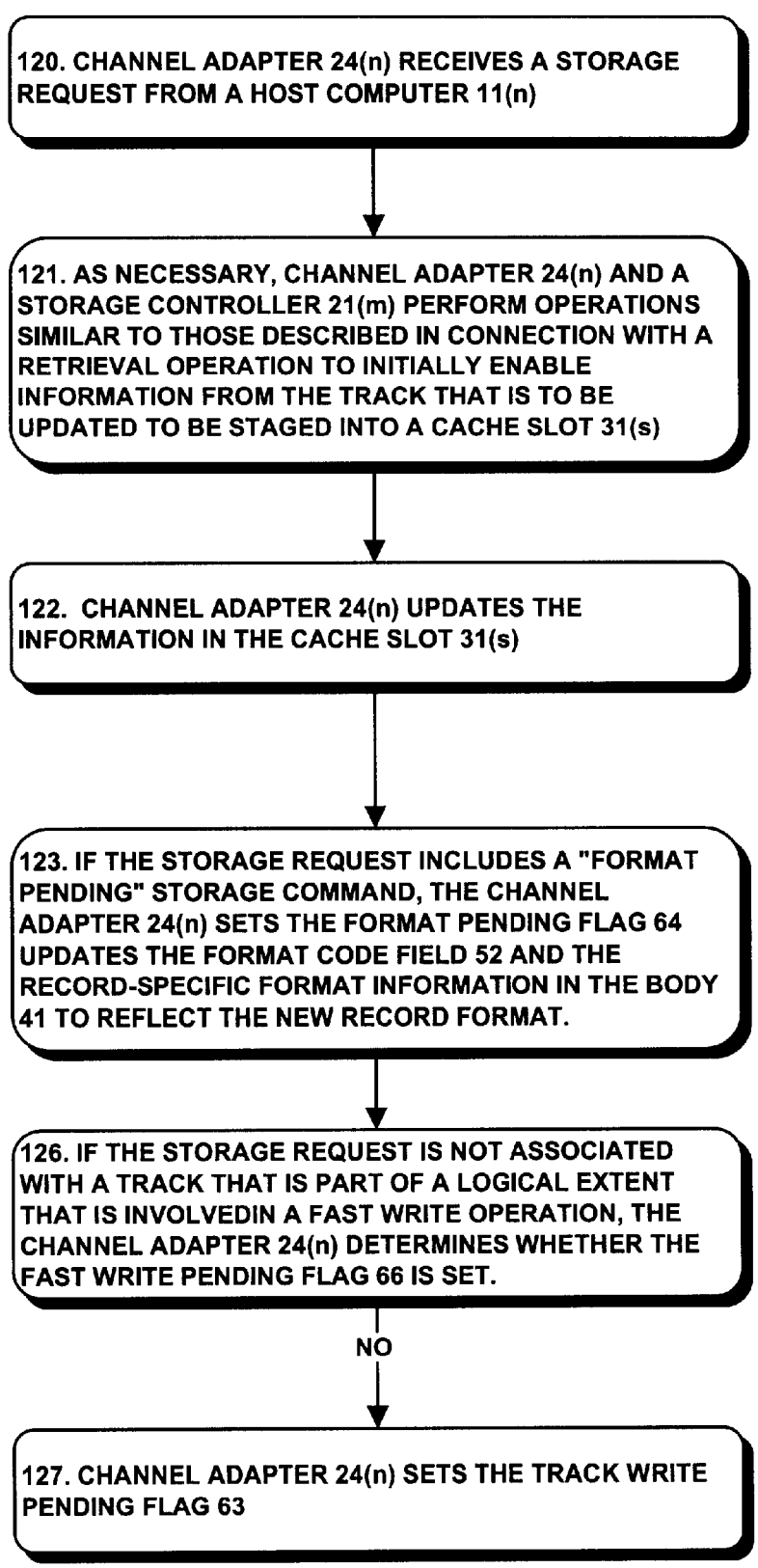

FIG. 5 contains a flow chart of operations performed by a channel adapter 24(n) and storage controller 21(m) as described above.

In another aspect, the invention provides an arrangement for controlling operations performed by the digital data storage system 12 during a fast write operation. As described above, a host computer 11(n) can use a fast write operation to update information stored on a track one or more times, before the track is de-staged. A host computer 11(n) can initiate a fast write operation by providing a "define extent" command. A define extent command defines a particular logical extent of a disk storage device, which may comprise an entire device, a series of tracks within a disk storage device, a series of records, or any combination thereof. After the host computer 11(n) issues a "define extent" command, and before it issues a command to end the fast write operation, storage requests for storing information in tracks in the previously-defined logical extent will be carried out in "fast write" mode, in which updates to the information associated with the tracks, in response to storage requests therefor, are buffered in the respective cache slots. Before the channel adapter 24(n), in response to a storage request, updates the information that is associated with a track for the first time while the track is in fast write mode, the track descriptor 36(c)(t) associated with the track will be copied to the cache slot 31(s) in which the information from the track is to be stored. This will ensure that a copy of the track descriptor 36(c)(t) that describes the information as stored on the storage device 22 is stored in the common memory subsystem 30. After the track descriptor 36(c)(t) associated with the track that is to be updated has been copied to the cache slot 31(s), and after the information from the track has been cached in the cache slot 31(s), the channel adapter 24(n) can update the information in the cache slot 31(s), and update the track descriptor 36(c)(t) associated therewith in the cache index directory 32. In particular, the channel adapter 24(n) will set the fast write pending flag 65, but not the track write pending flag 63, in the track descriptor 36(c)(t) that is associated with the track. These operations can be repeated any of a number of times in connection with the same track or other tracks in the previously-defined logical extent in response to respective storage requests.

At some point later, the host computer 11(n) can issue a "commit" command or a "discard" command associated with the logical extent or some portion thereof. In response to a commit command, the storage controller(s) 21(m) associated with the logical extent will set the track write pending flag(s) 63 and/or format write pending flag(s) 65 that are associated with the track(s) whose information was updated, clear the fast write pending flag(s) 65, and enable the information from the cache slot(s) 31(s) to be de-staged and stored in the respective storage device(s) 22. In addition, the storage controller(s) 21(m) will enable the track descriptor(s) 36(c)(t) for the respective track(s) in the logical extent to be copied to the respective storage device(s) 22. Details of operations performed in connection with enabling the information from the cache slot(s) 31(s) to be de-staged and stored in the respective storage device(s) 22 will be described in connection with FIG. 4.

On the other hand, in response to a discard command, for the tracks in the previously-defined logical extent, the channel adapter 24(n) will copy the information that was previously copied from the track descriptor(s) 36(c)(t) to the respective cache slot(s) 31(s), to the track descriptor(s) 36(c)(t). In that operation, the channel adapter 24(n) will ensure that the track in cache flag(s) 61 in the track descriptor(s) 36(c)(t) associated with the tracks in the logical extent are clear. Providing that the track in cache flag(s) 61 are clear will ensure that, in response to a subsequent storage or retrieval request, information will be retrieved from the respective storage device 22 for retrieval in response to a retrieval request, or that is to be updated in response to a storage request. Providing that the information that was previously copied from the track descriptor(s) 36(c)(t) to the respective cache slot(s) 31(s), is copied back to the track descriptor(s) 36(c)(t) will ensure that the track descriptor(s) 36(c)(t) describe the information as stored on the tracks respective storage device(s) 22. It will be appreciated that, since it is desirable that the copies of the respective cache index tables 32(d) as stored on the storage devices 22 reflect the information that is stored on the storage devices 22, if a track descriptor that is associated with a track that forms part of a logical extent and that has been updated is to be stored on the respective storage device 22 that contains the respective track, the information for the track descriptor will be obtained from the cache slot 31(s) in which information from the track is stored, rather than from the track descriptor 36(c)(t) in the cache index table 32(d) that is stored in the cache index directory 32.

Figure 4:
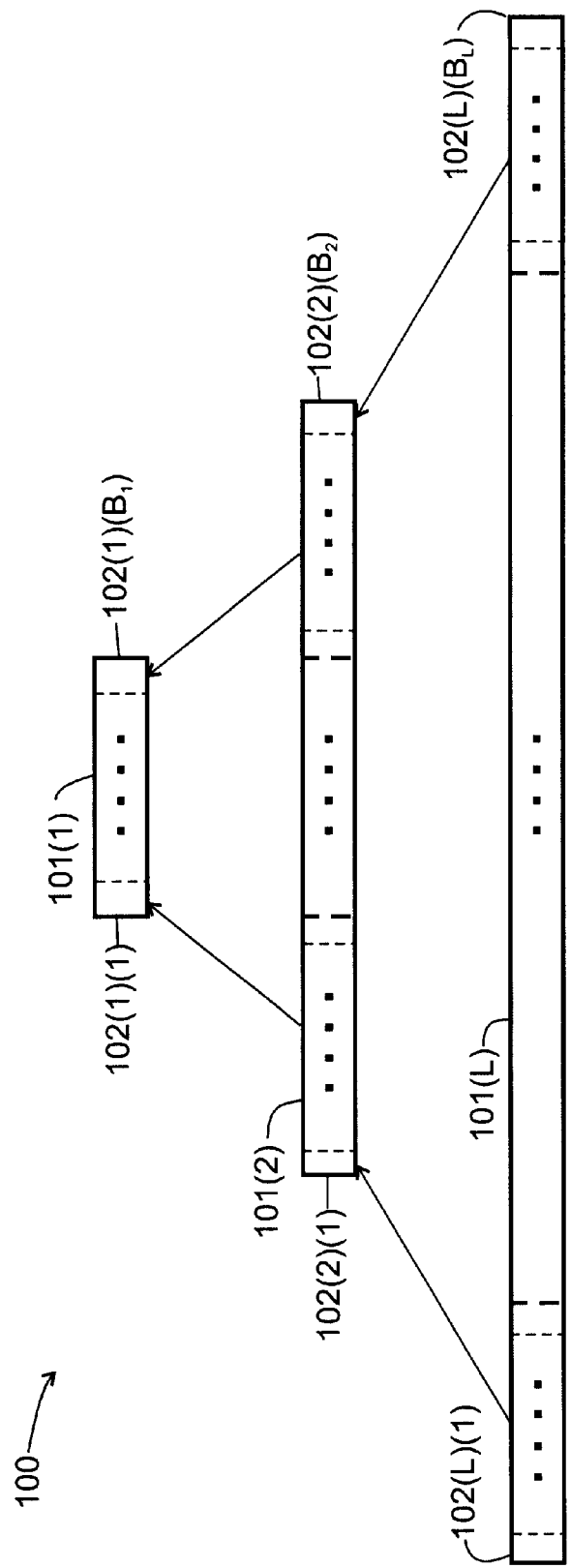
FIG. 4 depicts a data structure that is useful in connection with controlling a "fast write" operation.

FIG. 4 depicts an illustrative data structure 100 that is used by a storage controllers 24(n) in connection with scheduling transfers of information from respective cache slots 31(s) (FIG. 2) to a storage device 22. Generally, each storage device 22 is associated with a with a data structure 100, which provides flags that are used to identify tracks for which the track write pending flag 63 is set. Generally, the data structure 100 comprises a plurality of levels (three of which are depicted in the illustrative data structure depicted in FIG. 4) 101(1) through 101(L) (generally identified by reference numeral 101(1), in the shape of a pyramid, with level 101(1) being at the top (as shown in FIG. 4) of the pyramid and level 101(L) being at the bottom (also as shown in FIG. 4) of the pyramid. With reference to FIG. 4, each level 101(1) comprises a plurality of flags, generally identified by reference numeral 102(1)(b). In the lowest level 101(L), each flag 102(L)(t) is associated with the respective "t-th" track of the storage device 22, and will be set if a de-staging operation is pending for the associated track. In the next higher level 101(L-1), each flag 102(L-1)($b_{L-1}$) is associated with a predetermined number of flags 102(L)(t) in the level 101(L). If, for example, each flag 102(L-1)($b_{L-1}$) in level 101(L-1) is associated with eight consecutive flags 102(L)(t) in the lowest level in the data structure. Thus, for example, flag 102(L-1)(0) in level 101(L-1) may be associated with flags 102(L)(0) through 102(L)(7) in level 101(L), flag 102(L-1)(1) in level 101(L-1) may be associated with flags 102(L)(8) through 102(L)(15) in level 101(L), and so forth. Generally, flag 102(L-1)($b_{L-1}$)(b=0, 1, 2, . . . ) in level 102(L-1) will be associated with the series of flags 102(L)(8$b_{L-1}$), . . . 102(L)(8$b_{L-1}$+7) in the lowest level 101(L), and flag 102(L-1)($b_{L-1}$) will be set if any of the flags 102(L)(8$b_{L-1}$), . . . 102(L)(8$b_{L-1}$+7) in level 101(L) is set. As noted above, if a flag 102(L)(8$b_{L-1}$), . . . 102(L)(8$b_{L-1}$+7) in level 101(L) is set, a de-staging operation is pending for the track associated with the flag, and so if flag 102(L-1)($b_{L-1}$) is set in level 101(L-1), a de-staging operation will be pending for at least one of the tracks associated with flag 102(L)(8$b_{L-1}$), . . . 102(L)(8$b_{L-1}$+7) in level 101(L).

Similarly, in the next higher level 101(L-2), each flag 102(L-2)($b_{L-2}$) is associated with a predetermined number of flags 102(L-1)($b_{L-1}$) in the level 101(L). If, for example, each flag 102(L-1)($b_{L-2}$) in level 101(L-2) is associated with eight consecutive flags 102(L)($b_{L-1}$) in the level 101 (L-1) in the data structure. Thus, for example, flag 102(L-2)(0) in level 101(L-2) may be associated with flags 102(L-1)(0) through 102(L-1)(7) in level 101(L-1), flag 102(L-2)(1) in level 101(L-2) may be associated with flags 102(L-2)(8) through 102(L-2)(15) in level 101(L-1) and so forth. Generally, flag 102(L-1)($b_{L-2}$)(b=0, 1, 2, . . .) in level 102(L-2) will be associated with the series of flags 102(L-1)(8$b_{L-2}$), . . . 102(L-1)(8$b_{L-2}$+7) in the level 101(L-1), and will be indirectly associated with the series of flags 102(L)(8$b_{L-2}$), . . . 102(L)(8$b_{L-2}$+63) in the lowest level 101(L). Thus, if any of flags 102(L)(8b), . . . 102(L)(8b+7) in level 101(L) is set, a de-staging operation is pending for the track associated with the flag. As noted above, if a flag 102(L)(8$b_{L-2}$), . . . 102(L)(8$b_{L-2}$+63) in level 101(L) is set, a de-staging operation is pending for the track associated with the flag, and so if flag 102(L-2)($b_{L-2}$) is set in level 101(L-2), a de-staging operation will be pending for at least one of the tracks associated with flag 102(L)(8$b_{L-2}$), . . . 102(L)(8$b_{L-2}$+63) in level 101(L).

The flags of each successively higher level 101(L-3), . . . , 101(1) are conditioned in the same manner. Accordingly, if, for example, the storage device 22 comprises T tracks, numbered from 0 to T-1, and if "T" is evenly divisible by "eight," if a flag 102(1)($b_1$) at the highest level in the data structure 100 is set, at least one of flags 102(L)((L−1)b$_1$), ..., 102(L)((L−1)b$_1$+(⅛)−1) will be set to indicate that a de-staging operation is pending for the associated track.

When a channel adapter 24(n) receives a storage request, other than a storage request to initiate a fast write operation, or a commit command during a fast write operation, in addition to setting the track write pending flag 63 and (if it received a commit command) clearing the fast write pending flag 65 in the track descriptor 36(c)(t), it will also condition the flag 102(L)(t) in the lowest level 101(L) that is associated with the track in the data structure 100 that is associated with the storage device 22. In addition, the channel adapter 24(n) will ensure that the appropriate flags are set in the other levels 101(L−1). 101(1). On the other hand, when the appropriate storage controller 21(m) de-stages a track, in addition to clearing the write pending flag 63, the storage controller 21(m) will clear the flag 102(L)(t) associated with the track in the lowest level 101(L) of the data structure 100. In addition, the storage controller 21(m) will need to determine whether it should clear the flags in the successively higher levels 101(L−1), ... 101(1). In that operation, the storage controller 21(m) will, in a number of iterations related to the number "L" of levels in the data structure 100, determine whether the flag in the next higher level should be cleared. In the "l-th" iteration (l=0, ..., L−2), the storage controller 21(m) will test the flags 102(L−1)(b$_{8(L-)}$), ... 102(L−1)(b$_{8(L-1)}$+7) in level 102(L−1). If the storage controller 21(m) determines that all of the flags are clear, it will clear the flag 102(L−(l+1)) in the next higher level 101(L−(l+1)) in the data structure 100 and proceed to a subsequent iteration. On the other hand, if the storage controller 21(m) determines that at least one of flags 102(L−1)(b$_{8(L-)}$), ... 102(L−1)(b$_{8(L-1)}$+7) is set, it will terminate, since the associated flags in the higher levels 101(L−(l+1)) ... 101(1) in the data structure 100 are set and should remain set.

In one embodiment, in which the digital data storage subsystem 12 can be one of four digital data storage subsystem in a cluster of digital data storage subsystems that serves to provide mirrors for each other, each flag 102(L)(t) in the lowest level 101(L) of the data structure 100, and the track write pending flag 63 actually comprises four flags, one flag associated with each mirror. When a channel adapter 24(n) of the digital data storage system 12 comprising the "principle mirror" receives a storage request from a host computer 11(n), it will copy the storage request to the digital data storage subsystem comprising other active mirrors in the cluster. If all of the mirrors are active, and if a channel adapter 24(n) receives a storage request from a host computer 11(n), the channel adapter 24(n) will set all of the flags in the lowest level 101(L) of the data structure 100 associated with the track, as well as all of the track write pending flags 63 in the track descriptor 36(c)(t) that is associated with the track.

Similarly, if the channel adapter 24(n) of the digital data storage system 12 comprising the "principle mirror" receives a fast write command, a storage request in a fast write sequence, or a commit command from a host computer 11(n), it will also copy the respective fast write command, storage request or commit command to the digital data storage subsystem comprising the other active mirrors in the cluster. The channel adapter 24(n) can copy the respective command or request through an interface (not separately shown) that is provided therefor. When the channel adapter 24(n) receives a commit command from a host computer 11(n) to end a fast write pending operation, in addition to clearing the fast write pending flag 65, it will set all of the set all of the flags in the lowest level 101(L) of the data structure 100 associated with the track, as well as all of the track write pending flags 63 in the track descriptor 36(c)(t) that is associated with the track. When another digital data storage system forming part of the mirror cluster receives a request or command that has been copied from the principle mirror, it can perform similar operations, except that it will not copy the request or command to other digital data storage subsystems in the cluster.

On the other hand, if one or more of the mirrors is inactive or invalid, which may be because, for example, a mirror has malfunctioned, one of the mirrors has been severed for use as a data source for a backup operation, or for other reasons as will be apparent to those skilled in the art, the channel adapter 24(n), when it receives a commit command, will build a mask using the fast write pending flag 65 and the mirror flags 53, which mask will be used to control conditioning of the appropriate flags in the lowest level 101(L) of the data structure 100. In particular, the mirror flags 53 comprise four flags, one associated with each digital data storage system comprising a mirror. Each mirror flag that is associated with a mirror that is inactive nor invalid will be clear, and otherwise the respective mirror flag will be set. Accordingly, when a channel adapter 24(n) receives a commit command from a host computer 11(n), it will generate a mask using the fast write pending flag 65 and the mirror flags 53, and store the mask in the track write pending flag 63 and the flags in the lowest level 101(L) of the data structure 100. Thereafter, the channel adapter 24(n) can condition the flags in the other levels 101(L−1), ... 101(L) of the data structure as necessary.

Finally, when the storage controller 21(m) associated with a digital data storage system in the mirror cluster enables data from a cache slot 31(s) to be stored on a respective storage device 22 and clears the respective flag in the lowest level 101(L) of the data structure 100 that is associated with the mirror for the track that is transferred to the respective storage device 22 for storage therein, in addition to conditioning the respective flags in the higher levels 101(L−1), ... 101(1) as necessary, it will also transmit a notification thereof to the other digital data storage subsystems in the mirror cluster. When a digital data storage subsystem receives such a notification from another digital data storage system in the cluster, it (either the interface or the storage controller 21(m) can clear the appropriate flag in the lowest level 102(L) of the data structure 100, as well as the flags in the higher levels as necessary.

FIG. 6 is a flow chart of operations performed by a storage controller in connection with the operations performed in connection with data structure 100 in response to receipt of a storage request in connection with a track that is not part of a logical extent that is part of a "fast write" operation, or in response to receipt of a commit command in connection with a track that is part of a logical extent that is part of a "fast write" operation.

The invention provides a number of advantages. In particular, it provides a digital data storage subsystem in which formatting information for the various tracks can be efficiently stored, to efficiently accommodate formatting information for records stored on storage devices 22 that can each store large amounts of information. In particular, the invention reduces the amount of information stored in the cache index table 32(d) associated with a respective storage device 22 as stored in the cache index directory 32, allowing the cache index directory 32 to accommodate increased numbers of cylinder descriptors 35(c) for each storage device 22, increased numbers of track descriptors 36(c)(t)

for each cylinder, or both. The information is available in the copy of the cache index table as stored on the respective storage device, in which case, if the information is needed, it can be retrieved from the storage device. In addition, the invention provides an arrangement for efficiently controlling a "fast write" operation.

It will be appreciated that a number of modifications may be made to the digital data storage subsystem as described above in connection with FIGS. 1 through 6. For example, although the storage subsystem 12 has been described as being connected to a plurality of host computers 11(n), it will be appreciated that the storage subsystem may be used only in connection with a single host computer 11(n). In addition, although the storage subsystem 12 has been described as including a plurality of data stores 20(m) and a plurality of storage devices 22, it will be appreciated that the storage subsystem 12 may be provided with a single data store and a single storage device.

Further, although the storage subsystem 12 has been described such that, if transfers between a cache slot 31(s) and a storage device 22 in units of records, the track descriptors 36(c)(t) can include record-specific flags 61–66 associated with each record. Alternatively, record-specific flags and/or related information can be stored in, for example, each cache slot 31(s), and the channel adapters 24(n) and storage controllers 21(m) can make use of that information in a manner similar to that described above.

Further, although the storage subsystem 12 has been described as storing records in CKD format, it will be appreciated that the storage subsystem 12 may be used in connection with records in any format, and in fixed or variable lengths.

It will be appreciated that a system in accordance with the invention can be constructed in whole or in part from special purpose hardware or a general purpose computer system, or any combination thereof, any portion of which may be controlled by a suitable program.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A digital data storage system comprising:
   A. at least one storage device configured to store a series of records, the records being organized in a plurality of tracks, each track being associated with one of a plurality of cylinders;
   B. a descriptor memory configured to store at least one descriptor associated with said at least one storage device, said at least one descriptor containing selected information relating to the operational status at least one storage device, said selected information including, for each track, a write pending flag and a fast write pending flag;
   C. a channel adapter configured to receive requests from a host, one type of request including a fast write request to initiate a fast write operation in connection with one of said tracks and another type of request including a commit request to terminate the fast write operation, the channel adapter, after receiving a request of the fast write type for one of said tracks, setting the fast write pending flag associated with the one of said tracks, and, after receiving a request of the commit type for said one of said tracks, copying the fast write pending flag associated with the one of said tracks to the write pending flag associated with the one of said tracks, and clearing the fast write pending flag associated with the one of said tracks.

2. A digital data storage system as defined in claim 1 further comprising a memory configured to store a data structure, the data structure comprising a plurality of levels, including a lowest level and a highest level, the lowest level comprising a plurality of flags each associated with one of said tracks, and each successively higher level being associated with a selected series of flags in the next lower level, the channel adapter being configured to, after receiving a request of the commit type for said one of said tracks, also copying the fast write pending flag to the flag associated with the track in the lowest level, and ensure that the flags in the higher levels associated with that flag in the lowest level are also set.

3. A digital data storage system as defined in claim 2 further comprising a storage controller configured to use the data structure in connection with transfers of data to the storage device for storage.

4. A digital data storage system as defined in claim 3 in which the storage controller is configured to, in connection with using the data structure, determine from the flags comprising the highest level of the data structure whether any of the flags in the lowest level of the data structure are set, and, if so, proceed through successive levels down the data structure to identify the tracks for which the flags in the lowest level of the data structure are set, and controlling transfer of data for the identified tracks.

5. A digital data storage system as defined in claim 4 in which the storage controller is configured to, after data for one of said identified tracks has been transferred to the storage device, clear the flag in the lowest level associated with said one of said identified tracks and selectively condition the flags in the higher levels of the data structure based on the respective condition of the other flags associated therewith.

* * * * *